Jan. 6, 1942.     C. N. BERGMANN     2,268,542
CONVEYER CHAIN
Filed Jan. 15, 1940     2 Sheets-Sheet 1

INVENTOR.
Christian N. Bergmann
BY
ATTORNEY.

Jan. 6, 1942.  C. N. BERGMANN  2,268,542
CONVEYER CHAIN
Filed Jan. 15, 1940   2 Sheets-Sheet 2

INVENTOR.
Christian N. Bergmann
BY
ATTORNEY.

Patented Jan. 6, 1942

2,268,542

UNITED STATES PATENT OFFICE 2,268,542

CONVEYER CHAIN

Christian N. Bergmann, Pittsburgh, Pa., assignor of one-third to Charles M. Clarke, Sewickley, Pa.

Application January 15, 1940, Serial No. 313,816

9 Claims. (Cl. 198—189)

This invention is an improvement in the class of conveyer chains for transportation of bottles, cans, etc., along a supporting trackway, in straight or variable direction.

It is of the general class composed of a series of interconnecting link platform members, actuated by a driving sprocket wheel and so constructed as to provide for universal flexibility in vertical or lateral directions.

Generally stated, it comprises a series of such members each having a flat upper supporting face for placement of the article to be moved, a middle base portion having a shouldered sprocket tooth recess, oppositely disposed lower extensions of the base provided with link holes for connection with an adjacent member, open sided connecting links therefor, lubricating grooves on the under bearing sides of said members, etc., as shall be more fully hereinafter described. The series of such supporting members, when connected together and actuated, are designed to be moved by sprocket engagement and to transport any suitable articles from a receiving station to a delivering station or location in the form of an endless chain belt.

Preferred embodiments of the invention are illustrated in the accompanying drawings, in which.

Referring to Figs. 1 to 6 of the drawings, each of the supporting link members of the chain is indicated at A.

Such member, as in Figs. 1 to 5, is preferably made of a single casting of suitable metal. It has a flat platform top or carrier plate provided with parallel side edges 2 and endmost edges 3 sloping in opposite directions from the middle end portions, to provide for lateral deflection of the conveyer in passing around a corner, as in Fig. 1.

Figure 1:
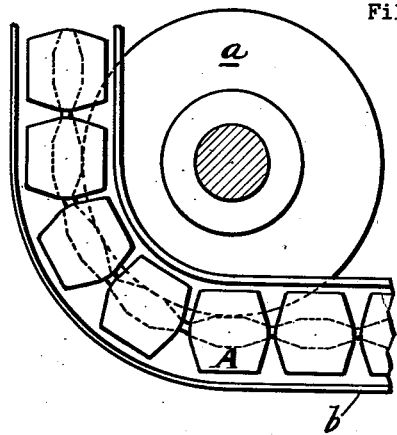
Fig. 1 is a plan view partly broken away, showing one arrangement of such a conveyer.
Figure 3:
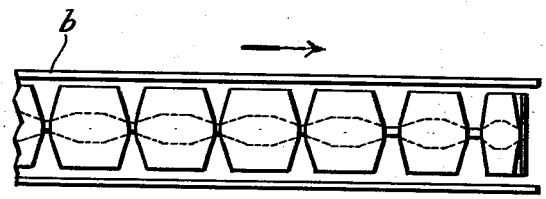
Fig. 3 is an enlarged cross sectional view on the line III—III of Fig. 2.
Figure 3:
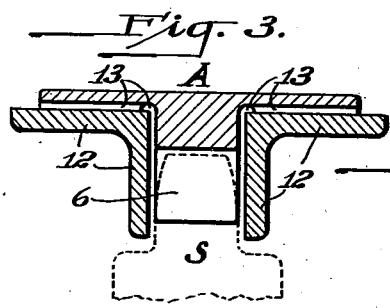
Figure 2:
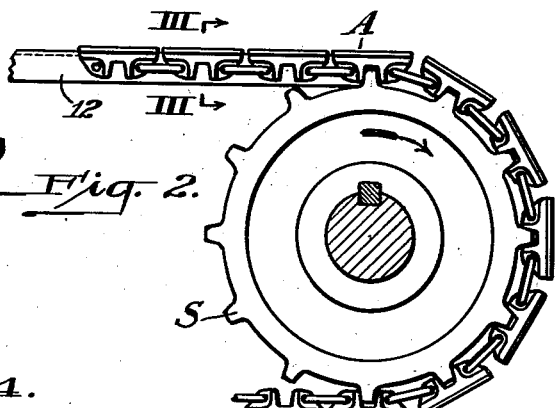
Fig. 2 is a partial view of the same in elevation.
Figure 4:
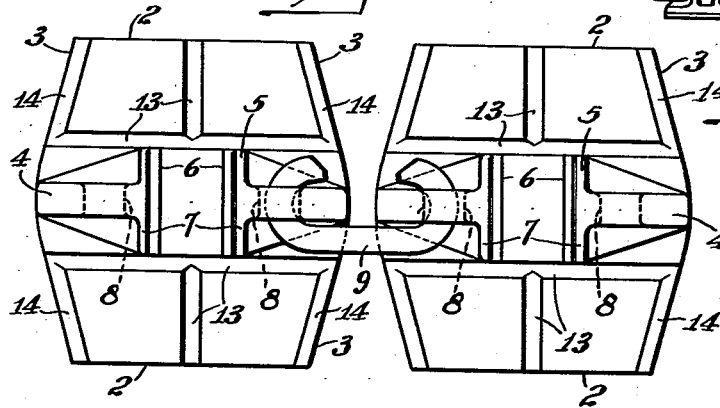
Fig. 4 is a full size plan view of the under side of two of the supporting members, as connected.
Figure 6:
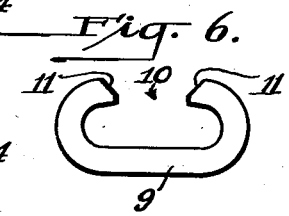
Fig. 6 is a detail view of one of the open side connecting links.
Figure 5:
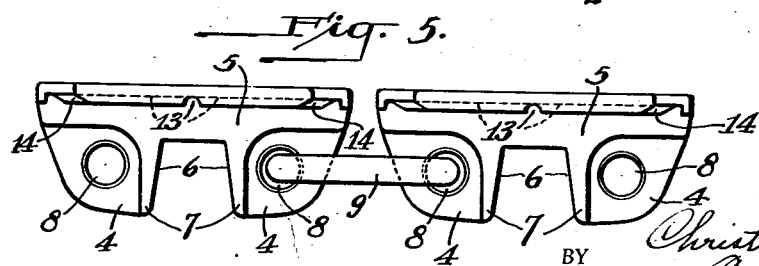
Fig. 5 is a partial edge view of Fig. 4 in operative position, as in Fig. 2.
Figure 7:
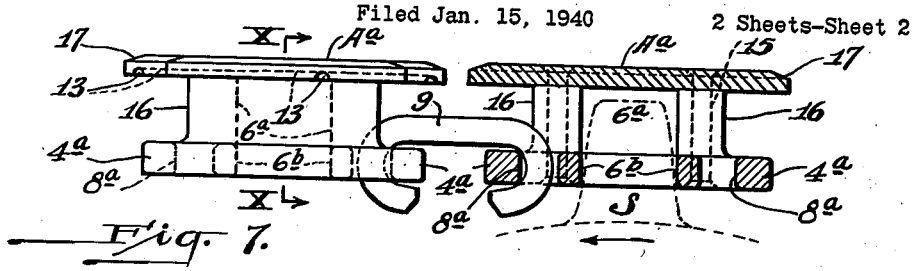
Fig. 7 is a view of two connected links in elevation and longitudinal section respectively, illustrating a modified construction.
Figure 8:
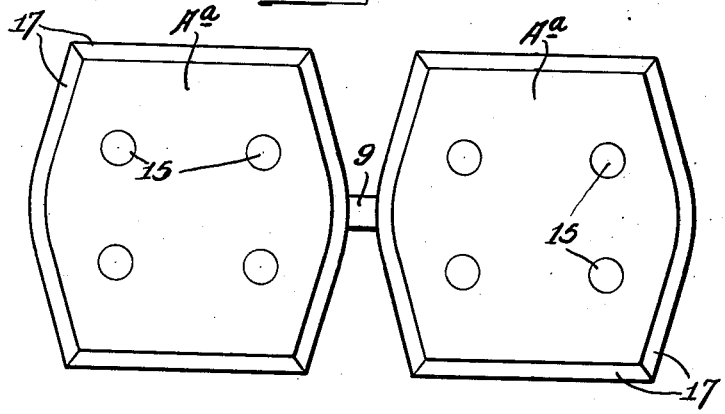
Fig. 8 is a top plan view thereof.
Figure 9:
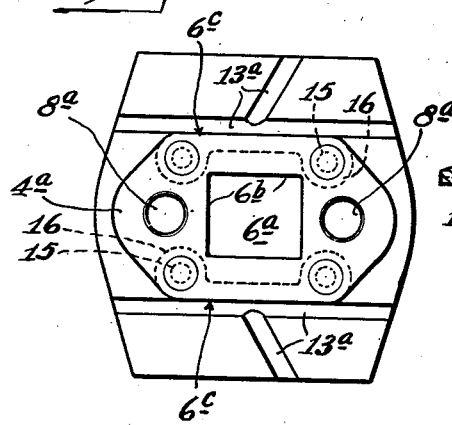
Fig. 9 is an under plan view of one of said links.
Figure 10:
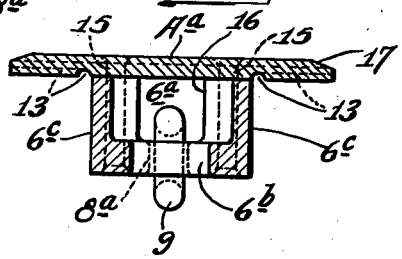
Fig. 10 is a vertical cross section on the line X, X, of Fig. 7.

In such lateral deflection of the chain of link members, they are guided by the usual trackway members, depending on the angular change in direction, or may be assisted by any suitable means, as the guiding wheel $a$ and suitable lateral guides $b$, as in Fig. 1.

Extending downwardly from the middle under portion of the platform of supporting link member A is a base extension comprising a pair of centrally arranged terminal lugs or webs 4 merging into the relatively wider middle base portion 5 having the sprocket tooth cavity 6 between the tooth engaging cheeks 7, for sprocket teeth S. Said middle portion 5 acts as a guiding and bracing extension in connection with the usual flanking trackway.

Each of the central webs 4 extends downwardly to substantially the same depth as cheeks 7 and each is provided with a transverse hole 8 for connection with an adjacent member by the link 9. Link 9 is open at one side, as at 10, Fig. 6, between the preferably beveled terminals 11 of the reversed ends of the link, facilitating easy insertion through holes 8.

Ordinarily, link members of the general type of members A, are supported by their laterally extending opposite side portions upon a trackway of suitable construction, as for instance, angle members 12. Such trackway members extend inwardly from opposite sides with an intervening clearance space, through and between which trackway members the middle web and cheek members 4—7 extend downwardly, as in Fig. 3. Members 12 constitute supporting trackways, over and upon which the lateral sides of the platforms of the chain members move with their supported loads.

Such movement involves continuous friction and resulting wear and thinning of the lateral wing portions of members A.

For the purpose of lubricating the trackway and the several members, each platform of such member A is provided on its under opposite sides with a series of connected grooves 13 extending lengthwise and crosswise, at each side of the middle, and providing containing and distributing pockets for any suitable lubricant.

Distribution of the lubricant is facilitated by terminal under beveling of the several link members, as indicated at 14.

These features are of great advantage in contributing to the easy running operation of such an equipment and tend to greatly increase the life of the several link members, when used daily, as in a modern dairy plant.

I show in Figs. 7 to 10 inclusive a modified construction in which the platform portion A^a is separately connected with the sprocket engaging and link connecting portion by any suitable means, as screws or rivets 15, countersunk at the supporting face as shown.

In such case the sprocket tooth opening 6a is provided between endmost inner edges 6b of a substantially flat supporting body or base portion having outer sides 6c connecting the endmost webs 4a, and enclosing the sprocket tooth opening. The lugs 4a in such construction lie in horizontal planes, instead of vertical, and are provided with outer link-engaging vertical holes 8a as shown, with ample clearance between opposite connecting bosses 16 for the screws or rivets 15.

It will be understood also that with either form the driving or idle sprocket wheels should be provided with ample clearance between the teeth for the several connecting links.

In such construction the open side links 9, as before described, are easily inserted and connect the webs of adjacent links in the same manner, but vertically disposed, as shown.

If desired, the under opposite sides of platform members A^a may be similarly provided with lubricant distributing grooves 13a, the laterally extending grooves being disposed angularly outward toward the direction of travel, tending to deflect flow of lubricant inwardly towards the middle, at both sides.

The advantage in providing the separate and separable platform A^a is that worn or broken platforms may be easily substituted and used with the same base members, at slight additional cost.

Such grooves, while of great advantage and usefulness when the metal is cast, as in bronze or the like, may be omitted where such a metal as stainless steel is used for the separable platforms.

In either construction it is desirable to bevel the several upper edges of the supporting platforms as indicated at 17 thus avoiding obstruction to passage of supported articles on to the conveyer from any direction. Such beveling is also of advantage wherever inequalities in level arise from any cause, as for instance where a new link of standard thickness gauge is coupled with a worn link of reduced thickness.

In either form, i. e. integral or compound, the link members are comparatively simple and inexpensive, capable of easy connection and installation, and of ample flexibility both laterally and vertically, as in various directions of travel of a continuous conveyer for many different adaptations in use.

It will be observed also that both forms provide, in their under supporting base portions, substantial parallel side bearing faces which extend between the trackway members 12, with suitable clearance. Also that the opposite end portions of such base elements are preferably tapered, terminating in the link-engaging apertured webs 4 or 4a, facilitating laterally deflected movement in varying directions of trackway travel.

While the several parts may be made of any suitable metal, is is preferred that they be of any well known rustless composition wherever subject to the effects of moisture, as in a dairy, brewery, or other such installation.

The construction and operation of the invention will be readily understood from the foregoing description. It is extremely simple, cheap, and capable of continuous operation without failure or breakage. The construction of the link members and the open side connecting links render it very easy to replace a broken part without loss of time and without special skill.

The construction is available for use in various locations and may be adapted to transportation of different articles of various sizes and weights; it may be varied in dimensions or special design to suit all such conditions; and may be adapted to various installations as to direction of movement with great facility and ease, or changed or varied from by the skilled mechanic, within the scope of the following claims.

I claim:

1. A conveyer chain consisting of a series of supporting members each having a platform and a connected base provided with a sprocket tooth recess and opposite terminal lug portions having link-engaging holes, and open side links connecting adjacent members through said holes.

2. A conveyer chain consisting of a series of supporting members each having a platform and a connected base provided with a sprocket tooth recess and opposite terminal lug portions at either end of the base on a longitudinal center line having link-engaging holes, and links connecting adjacent members through said holes.

3. A conveyer chain consisting of a series of supporting members each having a platform and a connected base provided with a sprocket tooth recess and opposite terminal lug portions midway of the base and below the platform having link-engaging holes, and open side links connecting adjacent members through said holes.

4. A conveyer chain consisting of a series of supporting members each having a platform and a connected base provided with a sprocket tooth recess, middle parallel lateral guiding portions, and endmost lug portions having link-engaging holes, and open side links connecting adjacent members through said holes.

5. A conveyer chain consisting of a series of supporting members each having a beveled edge platform and a connected base provided with a sprocket tooth recess and opposite terminal lug portions having link engaging holes, and open side links connecting adjacent members through said holes.

6. A conveyer chain consisting of members each having a supporting platform and a connected integral middle longitudinal guiding base provided with a sprocket tooth recess and opposite uniform terminal lug portions having horizontally disposed link-engaging holes, and separable links for connecting adjacent chain members by said holes.

7. A conveyer chain consisting of members each having a supporting platform and a connected base provided with a sprocket tooth recess and opposite uniform terminal lug portions having vertically disposed link-engaging holes, and separable links for connecting adjacent chain members by said holes.

8. A conveyer chain member having a flat supporting platform, a separate base member having depending guiding side portions connected therewith and having tapered end portions for curved trackway clearance, said end portions having between them a sprocket tooth recess, and each end portion having a terminal lug provided with a link-engaging hole.

9. In a conveyer chain member, the combination with a flat supporting plate, of a lower base member having a bottom portion spaced below the plate provided with a middle rectangular sprocket tooth recess and integral side portions, means extending through tubular extensions of the side portions, connecting the base with the supporting plate, and oppositely extending end portions of the base terminating in uniform apertured lugs.

CHRISTIAN N. BERGMANN.